US007828920B2

(12) United States Patent
Xu et al.

(10) Patent No.: US 7,828,920 B2
(45) **Date of Patent: *Nov. 9, 2010**

(54) METHOD OF MAKING MULTICONDUCTOR CABLE ASSEMBLIES

(75) Inventors: James J Xu, Niskayuna, NY (US); Vijay R Mhetar, Slingerlands, NY (US); Richard Peters, Dalton, MA (US); Vijay Rajamani, Slingerlands, NY (US)

(73) Assignee: Sabic Innovative Plastics IP B.V. (NL)

(*) Notice: Subject to any disclaimer, the term of this patent is extended or adjusted under 35 U.S.C. 154(b) by 85 days.

This patent is subject to a terminal disclaimer.

(21) Appl. No.: 12/023,370

(22) Filed: Jan. 31, 2008

(65) Prior Publication Data

US 2008/0142145 A1 Jun. 19, 2008

Related U.S. Application Data

(62) Division of application No. 11/256,826, filed on Oct. 24, 2005, now Pat. No. 7,332,677.

(60) Provisional application No. 60/637,406, filed on Dec. 17, 2004, provisional application No. 60/637,008, filed on Dec. 17, 2004, provisional application No. 60/637,412, filed on Dec. 17, 2004, provisional application No. 60/637,419, filed on Dec. 17, 2004, provisional application No. 60/654,247, filed on Feb. 18, 2005.

(51) Int. Cl.
*B29C 70/52* (2006.01)

(52) U.S. Cl. ........................... 156/166; 156/47; 156/51; 174/110 R; 174/120 R; 174/120 SR

(58) Field of Classification Search .................. 156/47, 156/49, 51, 166; 174/110 R, 120 R, 120 AR, 174/120 SR, 251
See application file for complete search history.

(56) References Cited

U.S. PATENT DOCUMENTS 2,425,294 A * 8/1947 Morgan ...................... 310/208

(Continued)

FOREIGN PATENT DOCUMENTS

EP 0329423 8/1989

(Continued)

OTHER PUBLICATIONS

Polymers Net Base. Dec. 12, 2009. <http://www.polymersnetbase.com/>. polypropylene= http://db.polymersnetbase.com/polymer/polymer-print.asp?entry-id=1165 high density polyethylene= http://db.polymersnetbase.com/polymer/polymer-print.asp?entry-id=1210.*

(Continued)

*Primary Examiner*—Christina Johnson
*Assistant Examiner*—Elizabeth Royston
(74) *Attorney, Agent, or Firm*—Cantor Colburn LLP

(57) ABSTRACT

A method of making a multiconductor cable assembly is disclosed. The method comprises arranging two or more coated wires and at least partially bonding the wires, wherein one or more of the coated wires comprises a conductor and a covering comprising a thermoplastic composition. The thermoplastic composition comprises a poly(arylene ether), a polyolefin and a polymeric compatibilizer, and may further comprise a flame retardant.

21 Claims, 6 Drawing Sheets

U.S. PATENT DOCUMENTS

| | | | |
|---|---|---|---|
| 2,933,480 | A | 4/1960 | Gresham |
| 3,082,292 | A | 3/1963 | Gore |
| 3,093,621 | A | 6/1963 | Gladding |
| 3,211,709 | A | 10/1965 | Odamek et al. |
| 3,537,297 | A | 11/1970 | Robert et al. |
| 3,728,424 | A | 4/1973 | Bauer |
| 3,790,519 | A | 2/1974 | Wahlborg |
| 3,884,993 | A | 5/1975 | Gros |
| 3,894,999 | A | 7/1975 | Boozer et al. |
| 4,000,348 | A | 12/1976 | Harlow |
| 4,059,654 | A | 11/1977 | Von Bodugen et al. |
| 4,166,055 | A | 8/1979 | Lee |
| 4,239,673 | A | 12/1980 | Lee |
| 4,356,345 | A | 10/1982 | Gonia |
| 4,383,082 | A | 5/1983 | Lee |
| 4,443,657 | A | 4/1984 | Hill et al. |
| 4,529,652 | A | 7/1985 | Bussink et al. |
| 4,584,334 | A | 4/1986 | Lee et al. |
| 4,659,872 | A | 4/1987 | Dery et al. |
| 4,692,566 | A | 9/1987 | Kauffman |
| 4,760,118 | A | 7/1988 | White et al. |
| 4,783,579 | A | 11/1988 | Brandolf et al. |
| 4,990,558 | A | 2/1991 | DeNicola et al. |
| 5,166,264 | A | 11/1992 | Lee et al. |
| 5,258,455 | A | 11/1993 | Laughner et al. |
| 5,262,480 | A | 11/1993 | Lee |
| 5,294,655 | A | 3/1994 | Lee et al. |
| 5,359,150 | A | 10/1994 | Ikeuchi |
| 5,364,898 | A | 11/1994 | Lee et al. |
| 5,397,822 | A | 3/1995 | Lee |
| 5,455,292 | A | 10/1995 | Kakegawa et al. |
| 5,500,489 | A | 3/1996 | Shah et al. |
| 5,506,276 | A | 4/1996 | Martynowicz |
| 5,550,190 | A | 8/1996 | Hasegawa et al. |
| 5,592,739 | A | 1/1997 | Ferrill et al. |
| 5,885,710 | A | 3/1999 | MacDonald et al. |
| 6,045,883 | A | 4/2000 | Akiyama et al. |
| 6,225,565 | B1 | 5/2001 | Prysner |
| 6,306,978 | B1 | 10/2001 | Braat et al. |
| 6,429,237 | B1 | 8/2002 | Tooley |
| 6,585,836 | B2 * | 7/2003 | Inagaki et al. ................. 156/55 |
| 6,610,422 | B1 | 8/2003 | Ooi et al. |
| 6,627,701 | B2 | 9/2003 | Adedeji et al. |
| 6,646,168 | B2 | 11/2003 | Chaudary et al. |
| 6,646,205 | B2 | 11/2003 | Hase et al. |
| 6,651,317 | B2 | 11/2003 | Pedimonte |
| 6,737,586 | B2 | 5/2004 | Inagaki et al. |
| 7,084,347 | B2 | 8/2006 | Mhetar et al. |
| 7,217,885 | B2 | 5/2007 | Mhetar et al. |
| 7,217,886 | B2 | 5/2007 | Mhetar et al. |
| 7,220,917 | B2 * | 5/2007 | Mhetar et al. ........... 174/110 R |
| 2002/0035206 | A1 | 3/2002 | Kurasawa et al. |
| 2003/0026563 | A1 | 2/2003 | Rabate et al. |
| 2003/0036602 | A1 | 2/2003 | Adedeji et al. |
| 2004/0115381 | A1 * | 6/2004 | Harris et al. ............... 428/36.9 |
| 2004/0177993 | A1 | 9/2004 | Nagai et al. |
| 2005/0016753 | A1 | 1/2005 | Seigerschmidt |
| 2006/0106139 | A1 * | 5/2006 | Kosaka et al. ................. 524/90 |
| 2006/0131053 | A1 | 6/2006 | Kubo et al. |
| 2006/0134416 | A1 | 6/2006 | Kubo et al. |
| 2006/0135661 | A1 | 6/2006 | Mhetar et al. |
| 2006/0135695 | A1 | 6/2006 | Guo et al. |
| 2006/0278425 | A1 | 12/2006 | Harada et al. |
| 2007/0261878 | A1 | 11/2007 | Kosaka et al. |

FOREIGN PATENT DOCUMENTS

| | | |
|---|---|---|
| EP | 0362660 | 4/1990 |
| EP | 0369814 | 5/1990 |
| EP | 0379286 | 7/1990 |
| EP | 0467113 | 1/1992 |
| EP | 0413972 | 2/1994 |
| EP | 0719833 | 7/1996 |
| EP | 0732372 | 9/1996 |
| EP | 639620 | 4/1999 |
| JP | 11185532 | 7/1989 |
| JP | 02133462 | 5/1990 |
| JP | 060009828 | 1/1994 |
| JP | 06057130 | 3/1994 |
| JP | 07166026 | 6/1995 |
| JP | 07224193 | 8/1995 |
| JP | 09048883 | 2/1997 |
| JP | 09241446 | 9/1997 |
| JP | 11209534 | 8/1999 |
| JP | 2003226792 | 8/2003 |
| JP | 2003253066 | 9/2003 |
| JP | 2003261760 | 9/2003 |
| WO | WO 89/00756 | 1/1989 |
| WO | WO 9701600 | 1/1997 |
| WO | WO 0015680 | 3/2000 |
| WO | WO 0192410 | 2/2001 |
| WO | WO 03025064 | 3/2003 |

OTHER PUBLICATIONS

Japanese Patent No. JP09241446, abstract only.
Japanese Patent No. JP09048883, abstract only.
Japanese Patent No. JP07166026, abstract only.
Japanese Patent No. JP06057130, abstract only.
Japanese Patent No. JP2003261760, abstract only.
Japanese Patent No. JP11209534, abstract only.
Japanese Patent No. JP11185532, machine translation.
Japanese Patent No. JP07224193, machine translation.
Japanese Patent No. JP06009828, abstract only.
Japanese Patent No. JP02133462, abstract only.
Japanese Patent No. JP3220231, manual translation.
Japanese Patent No. JP3267146, manual translation.
Japanese Patent No. JP3418209, machine translation.
Japanese Patent No. JP3457042, manual translation.
Japanese Patent No. JP2003253066, abstract only.
International Search Report for International Application No. PCT/US2005/043405, mailed Mar. 14, 2006, 5 pages.

* cited by examiner

METHOD OF MAKING MULTICONDUCTOR CABLE ASSEMBLIES

CROSS REFERENCE TO RELATED APPLICATIONS

This application is a divisional application of application Ser. No. 11/256,826 filed on Oct. 24, 2005, which claims priority to U.S. Provisional Application Ser. Nos. 60/637,406, 60/637,008, 60/637,412, and 60/637,419 filed on Dec. 17, 2004, and U.S. Provisional Application Ser. No. 60/654,247, filed on Feb. 18, 2005, all of which are incorporated in their entirety by reference herein.

BACKGROUND OF INVENTION

Multiconductor cable assemblies have become commonplace in electrical devices for power and signal transmission between various components within such devices and between such devices. Ribbon cables, often referred to as flat conductor cables, are generally preferred in wiring technology for multiconductor cable assemblies particularly because of their low height and weight, which is essentially determined only by the height and weight of the conductors. Ribbon cables by their nature take up little space and are flexible. Due to their good electrical and mechanical properties and low space requirements, these flat ribbon cables are useful for wiring public utility apparatuses, for power and signal transmission between fixed and movable parts of motor vehicles and in office automation apparatuses and the like.

The commonly used electrically insulating material for multiconductor cable assemblies is PVC. It is relatively inexpensive, widely available, flexible and has natural flame resistant properties. There is an increasing desire to reduce or eliminate the use of halogenated resins in insulating layers due to their negative impact on the environment. In fact, many countries are beginning to mandate a decrease in the use of halogenated materials such as PVC. Therefore there is a continuing need to develop new multiconductor cable assemblies wherein the electrical insulation material, i.e. covering, in the assembly is not PVC or other halogen-based material.

BRIEF DESCRIPTION OF THE INVENTION

The aforementioned need is addressed by a multiconductor cable assembly comprising two or more coated wires arranged in a side-by-side contiguous relation providing one or more substantially interfacing contact areas between adjacent coated wires;

wherein one or more of the coated wires comprises:

a conductor, and a covering comprising a thermoplastic composition and the thermoplastic composition comprises:

(i) a poly(arylene ether)

(ii) a polyolefin; and (iii) a polymeric compatibilizer wherein the covering is disposed over the conductor; and wherein each coated wire is at least partially bonded to an adjacent coated wire.

In another embodiment a method of making a multiconductor cable assembly comprising:

arranging two or more coated wires in a side-by-side contiguous relationship to provide one or more substantially interfacing contact areas between adjacent coated wires; and at least partially bonding the two or more coated wires using at least one of heat-pressing, ultrasonic welding, solvent welding, laser welding, adhesive bonding, and vibration welding wherein one or more of the coated wires comprises:

a conductor, and a covering comprising a thermoplastic composition and the thermoplastic composition comprises:

(i) a poly(arylene ether)

(ii) a polyolefin; and (iii) a polymeric compatibilizer wherein the covering is disposed over the conductor.

In another embodiment a multiconductor cable assembly is produced by a method comprising:

interposing a plurality of conductors between a first insulator sheet and a second insulator sheet; and at least partially bonding the first insulator sheet to the second insulator sheet, wherein the first and second insulator sheets, each have a length and a width and the length is greater than the width, and wherein the plurality of conductors are arranged in parallel relation to one another along a length of the first and second insulator sheets; and wherein one or more of the first and second insulator sheets comprise a thermoplastic composition comprising:

(i) a poly(arylene ether)

(ii) a polyolefin; and (iii) a polymeric compatibilizer.

The method may comprise, as a method of bonding the two insulator sheets, one or more of heat-pressing, ultrasonic welding, solvent welding, laser welding, adhesive bonding, and vibration welding.

DETAILED DESCRIPTION

Figure 1:
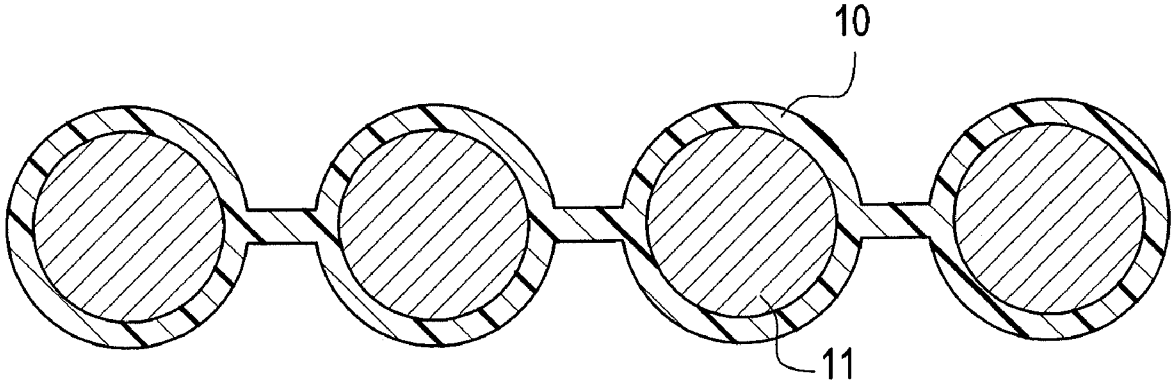
FIG. 1 is a schematic representation of a cross-section of a multiconductor cable assembly wherein the conductors, 11, are substantially in a single plane.

In this specification and in the claims, which follow, reference will be made to a number of terms which shall be defined to have the following meanings.

The singular forms “a,” “an,” and “the” include plural referents unless the context clearly dictates otherwise.

“Optional” or “optionally” means that the subsequently described event or circumstance may or may not occur, and that the description includes instances where the event occurs and instances where it does not.

The endpoints of all ranges reciting the same characteristic are independently combinable and inclusive of the recited endpoint. Values expressed as "greater than" or "less than" are inclusive the stated endpoint, e.g., "greater than 3.5" encompasses the value of 3.5.

As used herein an electrical wire is a wire comprising a conductor capable of transmitting detectable electric signal.

Poly(arylene ether)/polyolefin blends are an unlikely choice for the polymeric coverings in multiconductor cable assemblies for several reasons. These types of compositions have frequently been used in applications requiring rigidity but are generally considered unsuitable for applications requiring flexibility such as an multiconductor cable assemblies. Additionally, poly(arylene ether)/polyolefin blends, as described herein, have poly(arylene ether) dispersed in a polyolefin matrix. Given the known issues of metal catalyzed degradation in polyolefins it would seem unlikely that a composition having a polyolefin matrix could be successfully employed in an environment where metal catalyzed degradation is possible. Furthermore, poly(arylene ether) has a propensity to form particulates and gels when exposed to temperatures above its glass transition temperature (Tg), increasing the likelihood of imperfections in the polymeric covering resulting in spark leaks.

The thermoplastic composition that is used for the covering as described herein comprises at least two phases, a polyolefin phase and a poly(arylene ether) phase. The polyolefin phase is continuous. In some embodiments, the poly(arylene ether) phase is dispersed within the polyolefin phase. Good compatibilization between the phases can result in improved physical properties including higher impact strength at low temperatures and room temperature, better heat aging, better flame retardance, as well as greater tensile elongation. It is generally accepted that the morphology of the composition is indicative of the degree or quality of compatibilization. Small, relatively uniformly sized particles of poly(arylene ether) evenly distributed throughout an area of the composition are indicative of good compatibilization.

The thermoplastic compositions described herein are essentially free of an alkenyl aromatic resin such as polystyrene or rubber-modified polystyrene (also known as high impact polystyrene or HIPS). Essentially free is defined as containing less than 10 weight percent (wt %), or, more specifically less than 7 wt %, or, more specifically less than 5 wt %, or, even more specifically less than 3 wt % of an alkenyl aromatic resin, based on the combined weight of poly(arylene ether), polyolefin and block copolymer(s). In one embodiment, the composition is completely free of an alkenyl aromatic resin. Surprisingly the presence of the alkenyl aromatic resin can negatively affect the compatibilization between the poly(arylene ether) phase and the polyolefin phase.

In one embodiment, the composition has a flexural modulus of 2,000 to less than 18000 kilograms/centimeter$^2$ (kg/cm$^2$) (200 to less than 1800 Megapascals (MPa)). Within this range the flexural modulus may be greater than or equal to 8,000 kg/cm$^2$ (1000 Mpa), or, more specifically, greater than or equal to 10,000 kg/cm$^2$ (1200 Mpa). Also within this range the flexural modulus may be less than or equal to 17,000 kg/cm$^2$ (1700 Mpa), or, more specifically, less than or equal to 16,000 kg/cm$^2$ (1600 Mpa). Flexural modulus, as described herein, is determined using ASTM D790-03 using a speed of 1.27 millimeters per minute. Values are the average of three samples. The samples for flexural modulus are formed using an injection pressure of 600-700 kilograms-force per square centimeter and a hold time of 15 to 20 seconds on a Plastar Ti-80G$_2$ from Toyo Machinery & Metal Co. LTD. The remaining molding conditions are shown in Table 1.

TABLE 1

| | |
|---|---|
| Drying temperature (° C.) | 80 |
| Dry time in hours | 4 |
| Cylinder temperature (° C.) | |
| 1 | 240 |
| 2 | 250 |
| 3 | 260 |
| 4 | 260 |
| DH | 260 |
| Mold temperature (° C.) | 80 |

As used herein, a "poly(arylene ether)" comprises a plurality of structural units of Formula (I):

(I)

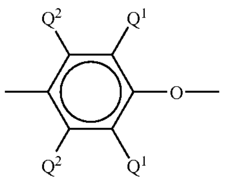

wherein for each structural unit, each $Q^1$ and $Q^2$ is independently hydrogen, halogen, primary or secondary lower alkyl (e.g., an alkyl containing 1 to 7 carbon atoms), phenyl, haloalkyl, aminoalkyl, alkenylalkyl, alkynylalkyl, hydrocarbonoxy, aryl and halohydrocarbonoxy wherein at least two carbon atoms separate the halogen and oxygen atoms. In some embodiments, each $Q^1$ is independently alkyl or phenyl, for example, $C_{1-4}$ alkyl, and each $Q^2$ is independently hydrogen or methyl. The poly(arylene ether) may comprise molecules having aminoalkyl-containing end group(s), typically located in an ortho position to the hydroxy group. Also frequently present are tetramethyl diphenylquinone (TMDQ) end groups, typically obtained from reaction mixtures in which tetramethyl diphenylquinone by-product is present.

The poly(arylene ether) may be in the form of a homopolymer; a copolymer; a graft copolymer; an ionomer; or a block copolymer; as well as combinations comprising at least one of the foregoing. Poly(arylene ether) includes polyphenylene ether comprising 2,6-dimethyl-1,4-phenylene ether units optionally in combination with 2,3,6-trimethyl-1,4-phenylene ether units.

The poly(arylene ether) may be prepared by the oxidative coupling of monohydroxyaromatic compound(s) such as 2,6-xylenol, 2,3,6-trimethylphenol and combinations of 2,6-xylenol and 2,3,6-trimethyphenol. Catalyst systems are generally employed for such coupling; they can contain heavy metal compound(s) such as a copper, manganese or cobalt compound, usually in combination with various other materials such as a secondary amine, tertiary amine, halide or combination of two or more of the foregoing.

In one embodiment, the poly(arylene ether) comprises a capped poly(arylene ether). The terminal hydroxy groups may be capped with a capping agent via an acylation reaction, for example. The capping agent chosen is desirably one that results in a less reactive poly(arylene ether) thereby reducing or preventing crosslinking of the polymer chains and the formation of gels or black specks during processing at elevated temperatures. Suitable capping agents include, for example, esters of salicylic acid, anthranilic acid, or a substituted derivative thereof, and the like; esters of salicylic acid, and especially salicylic carbonate and linear polysalicylates, are preferred. As used herein, the term "ester of salicylic acid" includes compounds in which the carboxy group, the hydroxy group, or both have been esterified. Suitable salicylates include, for example, aryl salicylates such as phenyl salicylate, acetylsalicylic acid, salicylic carbonate, and polysalicylates, including both linear polysalicylates and cyclic compounds such as disalicylide and trisalicylide. In one embodiment the capping agents are selected from salicylic carbonate and the polysalicylates, especially linear polysalicylates, and combinations comprising one of the foregoing. Exemplary capped poly(arylene ether) and their preparation are described in U.S. Pat. Nos. 4,760,118 to White et al. and 6,306,978 to Braat et al.

Capping poly(arylene ether) with polysalicylate is also believed to reduce the amount of aminoalkyl terminated groups present in the poly(arylene ether) chain. The aminoalkyl groups are the result of oxidative coupling reactions that employ amines in the process to produce the poly(arylene ether). The aminoalkyl group, ortho to the terminal hydroxy group of the poly(arylene ether), can be susceptible to decomposition at high temperatures. The decomposition is believed to result in the regeneration of primary or secondary amine and the production of a quinone methide end group, which may in turn generate a 2,6-dialkyl-1-hydroxyphenyl end group. Capping of poly(arylene ether) containing aminoalkyl groups with polysalicylate is believed to remove such amino groups to result in a capped terminal hydroxy group of the polymer chain and the formation of 2-hydroxy-N,N-alkylbenzamine (salicylamide). The removal of the amino group and the capping provides a poly(arylene ether) that is more stable to high temperatures, thereby resulting in fewer degradative products during processing of the poly(arylene ether).

The poly(arylene ether) can have a number average molecular weight of 3,000 to 40,000 grams per mole (g/mol) and a weight average molecular weight of 5,000 to 80,000 g/mol, as determined by gel permeation chromatography using monodisperse polystyrene standards, a styrene divinyl benzene gel at 40° C. and samples having a concentration of 1 milligram per milliliter of chloroform. The poly(arylene ether) or combination of poly(arylene ether)s has an initial intrinsic viscosity greater than or equal to 0.25 dl/g, as measured in chloroform at 25° C. Initial intrinsic viscosity is defined as the intrinsic viscosity of the poly(arylene ether) prior to melt mixing with the other components of the composition and final intrinsic viscosity is defined as the intrinsic viscosity of the poly(arylene ether) after melt mixing with the other components of the composition. As understood by one of ordinary skill in the art the viscosity of the poly(arylene ether) may be up to 30% higher after melt mixing. The percentage of increase can be calculated by (final intrinsic viscosity−initial intrinsic viscosity)/initial intrinsic viscosity. Determining an exact ratio, when two initial intrinsic viscosities are used, will depend somewhat on the exact intrinsic viscosities of the poly(arylene ether) used and the ultimate physical properties that are desired.

The poly(arylene ether) used to make the thermoplastic composition can be substantially free of visible particulate impurities. In one embodiment, the poly(arylene ether) is substantially free of particulate impurities greater than 15 micrometers in diameter. As used herein, the term "substantially free of visible particulate impurities" when applied to poly(arylene ether) means that a ten gram sample of a poly (arylene ether) dissolved in fifty milliliters of chloroform ($CHCl_3$) exhibits fewer than 5 visible specks when viewed in a light box. Particles visible to the naked eye are typically those greater than 40 micrometers in diameter. As used herein, the term "substantially free of particulate impurities greater than 15 micrometers" means that of a forty gram sample of poly(arylene ether) dissolved in 400 milliliters of $CHCl_3$, the number of particulates per gram having a size of 15 micrometers is less than 50, as measured by a Pacific Instruments ABS2 analyzer based on the average of five samples of twenty milliliter quantities of the dissolved polymeric material that is allowed to flow through the analyzer at a flow rate of one milliliter per minute (plus or minus five percent).

The insulating composition for the covering comprises the poly(arylene ether) in an amount of 30 to 65 weight percent (wt %), with respect to the total weight of the composition. Within this range the amount of poly(arylene ether) may be greater than or equal to 40 wt %, or, more specifically, greater than or equal to 45 wt %. Also within this range the amount of poly(arylene ether) may be less than or equal to 55 wt %.

Polyolefins are of the general structure: $C_nH_{2n}$ and include polyethylene, polypropylene and polyisobutylene. Exemplary homopolymers include polyethylene, LLDPE (linear low density polyethylene), HDPE (high density polyethylene) and MDPE (medium density polyethylene) and isotatic polypropylene. Polyolefin resins of this general structure and methods for their preparation are well known in the art and are described for example in U.S. Pat. Nos. 2,933,480, 3,093,621, 3,211,709, 3,646,168, 3,790,519, 3,884,993, 3,894,999, 4,059,654, 4,166,055 and 4,584,334.

Copolymers of polyolefins may also be used such as copolymers of ethylene and alpha olefins like propylene, octene and 4-methylpentene-1 as well as copolymers of ethylene and one or more rubbers and copolymers of propylene and one or more rubbers. Copolymers of ethylene and $C_3$-$C_{10}$ monoolefins and non-conjugated dienes, herein referred to as EPDM copolymers, are also suitable. Examples of suitable $C_3$-$C_{10}$ monoolefins for EPDM copolymers include propylene, 1-butene, 2-butene, 1-pentene, 2-pentene, 1-hexene, 2-hexene and 3-hexene. Suitable dienes include 1,4 hexadiene and monocyclic and polycyclic dienes. Mole ratios of ethylene to other $C_3$-$C_{10}$ monoolefin monomers can range from 95:5 to 5:95 with diene units being present in the amount of from 0.1 to 10 mol %. EPDM copolymers can be functionalized with an acyl group or electrophilic group for grafting onto the polyphenylene ether as disclosed in U.S. Pat. No. 5,258,455.

The thermoplastic composition may comprise a single homopolymer, a combination of homopolymers, a single copolymer, a combination of copolymers or a combination comprising a homopolymer and a copolymer.

In one embodiment the polyolefin is selected from the group consisting of polypropylene, high density polyethylene and combinations of polypropylene and high density polyethylene. The polypropylene can be homopolypropylene or a polypropylene copolymer. Copolymers of polypropylene and rubber or block copolymers are sometimes referred to as impact modified polypropylene. Such copolymers are typically heterophasic and have sufficiently long sections of each component to have both amorphous and crystalline phases. Additionally the polypropylene may comprise a combination of homopolymer and copolymer, a combination of homopolymers having different melting temperatures, or a combination of homopolymers having different melt flow rates.

In one embodiment the polypropylene comprises a crystalline polypropylene such as isotactic polypropylene. Crystalline polypropylenes are defined as polypropylenes having a crystallinity content greater than or equal to 20%, or, more specifically, greater than or equal to 25%, or, even more specifically, greater than or equal to 30%. Crystallinity may be determined by differential scanning calorimetry (DSC).

In some embodiments the polypropylene has a melting temperature greater than or equal to 134° C., or, more specifically, greater than or equal to 140° C., or, even more specifically, greater than or equal to 145° C.

The polypropylene has a melt flow rate (MFR) greater than 0.4 grams per 10 minutes and less than or equal to 15 grams per ten minutes (g/10 min). Within this range the melt flow rate may be greater than or equal to 0.6 g/10 min. Also within this range the melt flow rate may be less than or equal to 10, or, more specifically, less than or equal to 6, or, more specifically, less than or equal to 5 g/10 min. Melt flow rate can be determined according to ASTM D1238 using either powdered or pelletized polypropylene, a load of 2.16 kilograms and a temperature of 230° C.

The high density polyethylene can be homo polyethylene or a polyethylene copolymer. Additionally the high density polyethylene may comprise a combination of homopolymer and copolymer, a combination of homopolymers having different melting temperatures, or a combination of homopolymers having a different melt flow rate and generally having a density of 0.941 to 0.965 g/cm$^3$.

In some embodiments the high density polyethylene has a melting temperature greater than or equal to 124° C., or, more specifically, greater than or equal to 126° C., or, even more specifically, greater than or equal to 128° C.

The high density polyethylene has a melt flow rate (MFR) greater than or equal to 0.10 grams per 10 minutes and less than or equal to 15 grams per ten minutes (g/10 min). Within this range the melt flow rate may be greater than or equal to 1.0 g/10 min. Also within this range the melt flow rate may be less than or equal to 10, or, more specifically, less than or equal to 6, or, more specifically, less than or equal to 5 g/10 min. Melt flow rate can be determined according to ASTM D1238 using either powdered or pelletized polyethylene, a load of 2.16 kilograms and a temperature of 190° C.

In one embodiment, the polyolefin comprises (i) an ethylene/$C_7$-$C_{20}$ alpha olefin copolymer having an alpha olefin content greater than or equal to about 10%, (ii) a thermoplastic vulcanizate, (iii) a combination of linear low density polyethylene and a thermoplastic vulcanizate, (iv) a combination of an ethylene/$C_7$-$C_{20}$ alpha olefin copolymer having an alpha olefin content greater than or equal to about 10%, a linear low density polyethylene, and a thermoplastic vulcanizate, (v) a combination of an ethylene/$C_7$-$C_{20}$ alpha olefin copolymer having an alpha olefin content greater than or equal to about 10% and a thermoplastic vulcanizate or (vi) a combination of an ethylene/$C_7$-$C_{20}$ alpha olefin copolymer having an alpha olefin content greater than or equal to about 10% and linear low density polyethylene.

The composition may comprise polyolefin in an amount of 15 to 35 weight percent (wt %), with respect to the total weight of the composition. Within this range the amount of polyolefin may be greater than or equal to 17 wt %, or, more specifically, greater than or equal to 20 wt %. Also within this range the amount of polyolefin may be less than or equal to 33 wt %, or, more specifically, less than or equal to 30 wt %.

In one embodiment the polyolefin comprises high density polyethylene (HDPE) and polypropylene and the amount of HDPE by weight is less than the amount of polypropylene by weight.

In one embodiment the polyolefin is present in an amount by weight that is less than the amount of poly(arylene ether) by weight.

Polymeric compatibilizers are resins and additives that improve the compatibility between the polyolefin phase and the poly(arylene ether) phase. Polymeric compatibilizers include block copolymers, polypropylene-polystyrene graft copolymers and combinations of block copolymers and polypropylene-polystyrene graft copolymers as described below.

As used herein and throughout the specification "block copolymer" refers to a single block copolymer or a combination of block copolymers. The block copolymer comprises at least one block (A) comprising repeating aryl alkylene units and at least one block (B) comprising repeating alkylene units. The arrangement of blocks (A) and (B) may be a linear structure or a so-called radial teleblock structure having branched chains. A-B-A triblock copolymers have two blocks A comprising repeating aryl alkylene units. The pendant aryl moiety of the aryl alkylene units may be monocyclic or polycyclic and may have a substituent at any available position on the cyclic portion. Suitable substituents include alkyl groups having 1 to 4 carbons. An exemplary aryl alkylene unit is phenylethylene, which is shown in Formula II:

(II)

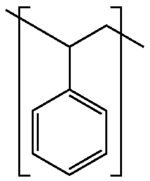

Block A may further comprise alkylene units having 2 to 15 carbons as long as the quantity of aryl alkylene units exceeds the quantity of alkylene units.

Block B comprises repeating alkylene units having 2 to 15 carbons such as ethylene, propylene, butylene or combinations of two or more of the foregoing. Block B may further comprise aryl alkylene units as long as the quantity of alkylene units exceeds the quantity of aryl alkylene units.

Each occurrence of block A may have a molecular weight which is the same or different than other occurrences of block A. Similarly each occurrence of block B may have a molecular weight which is the same or different than other occurrences of block B. The block copolymer may be functionalized by reaction with an alpha-beta unsaturated carboxylic acid.

In one embodiment, the B block comprises a copolymer of aryl alkylene units and alkylene units having 2 to 15 carbons such as ethylene, propylene, butylene or combinations of two or more of the foregoing. The B block may further comprise some unsaturated non-aromatic carbon-carbon bonds.

The B block may be a controlled distribution copolymer. As used herein "controlled distribution" is defined as referring to a molecular structure lacking well-defined blocks of either monomer, with "runs" of any given single monomer attaining a maximum number average of 20 units as shown by either the presence of only a single glass transition temperature (Tg), intermediate between the Tg of either homopolymer, or as shown via proton nuclear magnetic resonance methods. When the B block comprises a controlled distribution copolymer, each A block may have an average molecular weight of 3,000 to 60,000 g/mol and each B block may have an average molecular weight of 30,000 to 300,000 g/mol, as determined using light scattering techniques. When the B block is a controlled distribution polymer, each B block comprises at least one terminal region adjacent to an A block that is rich in alkylene units and a region not adjacent to the A block that is rich in aryl alkylene units. The total amount of aryl alkylene units is 15 to 75 weight percent, based on the total weight of the block copolymer. The weight ratio of alkylene units to aryl alkylene units in the B block may be 5:1 to 1:2. Exemplary block copolymers are further disclosed in U.S. Patent Application No. 2003/181584 and are commercially available from Kraton Polymers under the trademark KRATON. Exemplary grades are A-RP6936 and A-RP6935.

The repeating aryl alkylene units result from the polymerization of aryl alkylene monomers such as styrene. The repeating alkylene units result from the hydrogenation of repeating unsaturated units derived from a diene such as butadiene. The butadiene may comprise 1,4-butadiene and/or 1,2-butadiene. The B block may further comprise some unsaturated non-aromatic carbon-carbon bonds.

Exemplary block copolymers include polyphenylethylene-poly(ethylene/propylene)-polyphenylethylene (sometimes referred to as polystyrene-poly(ethylene/propylene)-polystyrene) and polyphenylethylene-poly(ethylene/butylene)-polyphenylethylene (sometimes referred to as polystyrene-poly(ethylene/butylene)-polystyrene).

In one embodiment, the polymeric compatibilizer comprises two block copolymers. The first block copolymer has an aryl alkylene content greater than to equal to 50 weight percent based on the total weight of the first block copolymer. The second block copolymer has an aryl alkylene content less than or equal to 50 weight percent based on the total weight of the second block copolymer. An exemplary combination of block copolymers is a first polyphenylethylene-poly(ethylene/butylene)-polyphenylethylene having a phenylethylene content of 15 weight percent to 40 weight percent, based on the total weight of the block copolymer and a second polyphenylethylene-poly(ethylene-butylene)-polyphenylethylene having a phenylethylene content of 55 weight percent to 70 weight percent, based on the total weight of the block copolymer may be used. Exemplary block copolymers having an aryl alkylene content greater than 50 weight percent are commercially available from Asahi under the trademark TUFTEC and have grade names such as H1043, as well as some grades available under the tradename SEPTON from Kuraray. Exemplary block copolymers having an aryl alkylene content less than 50 weight percent are commercially available from Kraton Polymers under the trademark KRATON and have grade names such as G-1701, G-1702, G-1730, G-1641, G-1650, G-1651, G-1652, G-1657, A-RP6936 and A-RP6935.

In one embodiment, the polymeric compatibilizer comprises a diblock block copolymer and a triblock block copolymer.

In one embodiment, the polymeric compatibilizer comprises two block copolymers, only one of which is a block copolymer comprising a B block that is a controlled distribution copolymer.

In some embodiments the block copolymer has a number average molecular weight of 5,000 to 1,000,000 grams per mole (g/mol), as determined by gel permeation chromatography (GPC) using polystyrene standards. Within this range, the number average molecular weight may be at least 10,000 g/mol, or, more specifically, at least 30,000 g/mol, or, even more specifically, at least 45,000 g/mol. Also within this range, the number average molecular weight may preferably be up to 800,000 g/mol, or, more specifically, up to 700,000 g/mol, or, even more specifically, up to 650,000 g/mol.

A polypropylene-polystyrene graft copolymer is herein defined as a graft copolymer having a propylene polymer backbone and one or more styrene polymer grafts.

The propylene polymer material that forms the backbone or substrate of the polypropylene-polystyrene graft copolymer is (a) a homopolymer of propylene; (b) a random copolymer of propylene and an olefin selected from the group consisting of ethylene and $C_4$-$C_{10}$ olefins, provided that, when the olefin is ethylene, the polymerized ethylene content is up to about 10 weight percent, preferably up to about 4 weight percent, and when the olefin is a $C_4$-$C_{10}$ olefin, the polymerized content of the $C_4$-$C_{10}$ olefin is up to about 20 weight percent, preferably up to about 16 weight percent; (c) a random terpolymer of propylene and at least two olefins selected from the group consisting of ethylene and $C_4$-$C_{10}$ alpha-olefins, provided that the polymerized $C_4$-$C_{10}$ alpha-olefin content is up to about 20 weight percent, preferably up to about 16 weight percent, and, when ethylene is one of the olefins, the polymerized ethylene content is up to about 5 weight percent, preferably up to about 4 weight percent; or (d) a homopolymer or random copolymer of propylene which is impact-modified with an ethylene-propylene monomer rubber in the reactor as well as by physical blending, the ethylene-propylene monomer rubber content of the modified polymer being about 5 to about 30 weight percent, and the ethylene content of the rubber being about 7 to about 70 weight percent, and preferably about 10 to about 40 weight percent. The $C_4$-$C_{10}$ olefins include the linear and branched $C_4$-$C_{10}$ alpha-olefins such as, for example, 1-butene, 1-pentene, 3-methyl-1-butene, 4-methyl-1-pentene, 1-hexene, 3,4-dimethyl-1-butene, 1-heptene, 1-octene, 3-methyl-hexene, and the like. Propylene homopolymers and impact-modified propylene homopolymers are preferred propylene polymer materials. Although not preferred, propylene homopolymers and random copolymers impact modified with an ethylene-propylene-diene monomer rubber having a diene content of about 2 to about 8 weight percent also can be used as the propylene polymer material. Suitable dienes include dicyclopentadiene, 1,6-hexadiene, ethylidene norbornene, and the like.

The term "styrene polymer", used in reference to the grafted polymer present on the backbone of propylene polymer material in the polypropylene-polystyrene graft copolymer, denotes (a) homopolymers of styrene or of an alkyl styrene having at least one $C_1$-$C_4$ linear or branched alkyl ring substituent, especially a p-alkyl styrene; (b) copolymers of the (a) monomers with one another in all proportions; and (c) copolymers of at least one (a) monomer with alpha-methyl derivatives thereof, e.g., alpha-methylstyrene, wherein the alpha-methyl derivative constitutes about 1 to about 40% of the weight of the copolymer.

The polypropylene-polystyrene graft copolymer can comprise about 10 to about 90 weight percent of the propylene polymer backbone and about 90 to about 10 weight percent of the styrene polymer graft. Within these ranges, the propylene polymer backbone may account for at least about 20 weight percent, of the total graft copolymer; and the propylene polymer backbone may account for up to about 40 weight percent of the total graft copolymer. Also within these ranges, the styrene polymer graft may account for at least about 50 weight percent, or, more specifically, at least about 60 weight percent, of the total graft copolymer.

The preparation of polypropylene-polystyrene graft copolymers is described, for example, in U.S. Pat. No. 4,990,558 to DeNicola, Jr. et al. Suitable polypropylene-polystyrene graft copolymers are also commercially available as, for example, P1045H1 and P1085H1 from Basell.

The polymeric compatibilizer is present in an amount of 2 to 30 weight percent, with respect to the total weight of the composition. Within this range the polymeric compatibilizer may be present in an amount greater than or equal to 4 weight percent, or, more specifically, greater than or equal to 6 weight percent with respect to the total weight of the composition. Also within this range the polymeric compatibilizer may be present in an amount less than or equal to 18, or, more specifically, less than or equal to 16, or, even more specifically, less than or equal to 14 weight percent with respect to the total weight of the composition.

As mentioned above, the thermoplastic composition may comprise an optional flame retardant or combination of flame retardants. Exemplary flame retardants include melamine (CAS No. 108-78-1), melamine cyanurate (CAS No. 37640-57-6), melamine phosphate (CAS No. 20208-95-1), melamine pyrophosphate (CAS No. 15541-60-3), melamine polyphosphate (CAS No. 218768-84-4), melam, melem, melon, zinc borate (CAS No. 1332-07-6), boron phosphate, red phosphorous (CAS No. 7723-14-0), organophosphate esters, monoammonium phosphate (CAS No. 7722-76-1), diammonium phosphate (CAS No. 7783-28-0), alkyl phosphonates (CAS No. 78-38-6 and 78-40-0), metal dialkyl phosphinate, ammonium polyphosphates (CAS No. 68333-79-9), low melting glasses and combinations of two or more of the foregoing flame retardants.

Exemplary organophosphate ester flame retardants include, but are not limited to, phosphate esters comprising phenyl groups, substituted phenyl groups, or a combination of phenyl groups and substituted phenyl groups, bis-aryl phosphate esters based upon resorcinol such as, for example, resorcinol bis-diphenylphosphate, as well as those based upon bis-phenols such as, for example, bis-phenol A bis-diphenylphosphate. In one embodiment, the organophosphate ester is selected from tris(alkylphenyl) phosphate (for example, CAS No. 89492-23-9 or CAS No. 78-33-1), resorcinol bis-diphenylphosphate (for example, CAS No. 57583-54-7), bis-phenol A bis-diphenylphosphate (for example, CAS No. 181028-79-5), triphenyl phosphate (for example, CAS No. 115-86-6), tris(isopropylphenyl) phosphate (for example, CAS No. 68937-41-7) and mixtures of two or more of the foregoing organophosphate esters.

In one embodiment the organophosphate ester comprises a bis-aryl phosphate of Formula III:

(III)

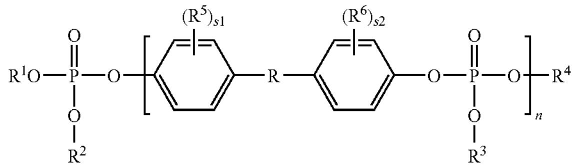

wherein R, $R^5$ and $R^6$ are independently at each occurrence an alkyl group having 1 to 5 carbons and $R^1$-$R^4$ are independently an alkyl, aryl, arylalkyl or alkylaryl group having 1 to 10 carbons; n is an integer equal to 1 to 25; and s1 and s2 are independently an integer equal to 0 to 2. In some embodiments $OR^1$, $OR^2$, $OR^3$ and $OR^4$ are independently derived from phenol, a monoalkylphenol, a dialkylphenol or a trialkylphenol.

As readily appreciated by one of ordinary skill in the art, the bis-aryl phosphate is derived from a bisphenol. Exemplary bisphenols include 2,2-bis(4-hydroxyphenyl)propane (so-called bisphenol A), 2,2-bis(4-hydroxy-3-methylphenyl) propane, bis(4-hydroxyphenyl)methane, bis(4-hydroxy-3,5-dimethylphenyl)methane and 1,1-bis(4-hydroxyphenyl) ethane. In one embodiment, the bisphenol comprises bisphenol A.

Organophosphate esters can have differing molecular weights making the determination of the amount of different organophosphate esters used in the insulating composition difficult. In one embodiment the amount of phosphorus, as the result of the organophosphate ester, is 0.8 weight percent to 1.2 weight percent with respect to the total weight of the composition.

The amount of the flame retardant, when present in the insulating composition, is sufficient for the coated wire to meet or exceed the flame retardance standards specified for the particular coated wire.

In one embodiment, the flame retardant comprises an organophosphate ester present in an amount of 5 to 20 weight percent (wt. %), with respect to the total weight of the composition. Within this range the amount of organophosphate ester can be greater than or equal to 7 wt. %, or more specifically, greater than or equal to 9 wt. %. Also within this range the amount of organophosphate ester can be less than or equal to 16 wt. %, or, more specifically, less than or equal to 14 wt. %.

Additionally, the composition may optionally also contain various additives, such as antioxidants; fillers and reinforcing agents having an average particle size less than or equal to 10 micrometers, such as, for example, silicates, $TiO_2$, fibers, glass fibers, glass spheres, calcium carbonate, talc, and mica; mold release agents; UV absorbers; stabilizers such as light stabilizers and others; lubricants; plasticizers; pigments; dyes; colorants; anti-static agents; foaming agents; blowing agents; metal deactivators, and combinations comprising one or more of the foregoing additives.

A method for making a covering material for use in a multiconductor cable assembly with few or no spark leaks comprises melt mixing (compounding) the components for the thermoplastic composition used to form the polymeric covering, typically in a melt mixing device such as an compounding extruder or Banbury mixer. In one embodiment, the poly(arylene ether), polymeric compatibilizer, and polyolefin are simultaneously melt mixed. In another embodiment, the poly(arylene ether), polymeric compatibilizer, and optionally a portion of the polyolefin are melt mixed to form a first melt mixture. Subsequently, the polyolefin or remainder of the polyolefin is further melt mixed with the first melt mixture to form a second melt mixture. Alternatively, the poly(arylene ether) and a portion of the polymeric compatibilizer may be melt mixed to form a first melt mixture and then the polyolefin and the remainder of the polymeric compatibilizer are further melt mixed with the first melt mixture to form a second melt mixture.

The aforementioned melt mixing processes can be achieved without isolating the first melt mixture or can be achieved by isolating the first melt mixture. One or more melt mixing devices including one or more types of melt mixing devices can be used in these processes. In one embodiment, some components of the thermoplastic composition that forms the covering may be introduced and melt mixed in an extruder used to coat the conductor.

When the polymeric compatibilizer comprises two block copolymers, one having an aryl alkylene content greater than or equal to 50 weight percent and a second one having an aryl alkylene content less than 50 weight percent, the poly(arylene ether) and the block copolymer having an aryl alkylene content greater than or equal to 50 weight percent can be melt mixed to form a first melt mixture and the polyolefin and a block copolymer having an aryl alkylene content less than or equal to 50 weight percent can be melt mixed with the first melt mixture to form a second melt mixture.

The method and location of the addition of the optional flame retardant is typically dictated by the identity and physical properties, e.g., solid or liquid, of the flame retardant as well understood in the general art of polymer alloys and their manufacture. In one embodiment, the flame retardant is combined with one of the components of the thermoplastic composition, e.g., a portion of the polyolefin, to form a concentrate that is subsequently melt mixed with the remaining components.

The poly(arylene ether), polymeric compatibilizer, polyolefin and optional flame retardant are melt mixed at a temperature greater than or equal to the glass transition temperature of the poly(arylene ether) but less than the degradation temperature of the polyolefin. For example, the poly(arylene ether), polymeric compatibilizer, polyolefin and optional flame retardant may be melt mixed at an extruder temperature of 240° C. to 320° C., although brief periods in excess of this range may occur during melt mixing. Within this range, the temperature may be greater than or equal to 250° C., or, more specifically, greater than or equal to 260° C. Also within this range the temperature may be less than or equal to 310° C., or, more specifically, less than or equal to 300° C.

After some or all the components are melt mixed, the molten mixture can be melt filtered through one of more filters having openings with diameters of 20 micrometers to 150 micrometers. Within this range, the openings may have diameters less than or equal to 130 micrometers, or, more specifically, less than or equal to 110 micrometers. Also within this range the openings can have diameters greater than or equal to 30 micrometers, or, more specifically, greater than or equal to 40 micrometers.

In one embodiment, the filter openings have a maximum diameter that is less than or equal to half of the thickness of the covering that will be applied to the conductor. For example, if the coated wire has a covering with a thickness of 200 micrometers, the filter openings have a maximum diameter less than or equal to 100 micrometers.

Any suitable melt filtration system or device that can remove particulate impurities from the molten mixture may be used. In one embodiment the melt is filtered through a single melt filtration system. Multiple melt filtration systems are also contemplated.

Suitable melt filtration systems include filters made from a variety of materials such as, but not limited to, sintered-metal, metal mesh or screen, fiber metal felt, ceramic, or a combination of the foregoing materials, and the like. Particularly useful filters are sintered metal filters exhibiting high tortuosity, including the sintered wire mesh filters prepared by Pall Corporation and Martin Kurz & Company, Inc.

Any geometry of melt filter may be used including, but not limited to, cone, pleated, candle, stack, flat, wraparound, screens, cartridge, pack disc, as well as a combination of the foregoing, and the like. The selection of the geometry can vary depending on various parameters such as, for example, the size of the extruder and the throughput rate desired as well as the degree of particle filtration that is desired. Exemplary materials of construction include stainless steels, titanium, nickel, as well as other metals alloys. Various weaves of wire fabric including plain, dutch, square, twill and combinations of weaves can be used. Especially useful are filters that have been designed to minimize internal volume and low flow areas and to withstand repeated cleaning cycles.

The melt filtration system may include a periodic or continuous screen changing filter or batch filters. For example, continuous screen changing filters may include a ribbon of screen filter that is slowly passed into the path of a melt flow in an extruder. The melt mixture passes through the filter and the filter collects particulate impurities within the melt and these impurities are carried out of the extruder with the filter ribbon as it is periodically or continuously renewed with a new section of ribbon.

The minimum size of the filter openings is dependent upon a number of variables. Smaller filter openings may result in greater pressure on the upstream side of the filter. Accordingly, the filter openings and method of operation must be chosen to prevent unsafe pressure on the upstream side. In addition the use of a filter having filter openings less than 20 micrometers can result in poor flow both upstream and downstream of the filter. Poor flow can extend the residence time for some portions of the melt mixture. Longer residence times can result in the creation or enlargement of particulates in the composition, which, when applied to the conductor, can cause spark leaks.

In one embodiment the melt filtered mixture is passed through a die head and pelletized by either strand pelletization or underwater pelletization. The pelletized material may be packaged, stored and transported. In one embodiment the pellets are packaged into metal foil lined plastic bags, typically polypropylene bags, or metal foil lined paper bags. Substantially all of the air can be evacuated from the pellet filled bags.

In one embodiment, the thermoplastic composition is substantially free of visible particulate impurities. Visible particulates or "black specks" are dark or colored particulates generally visible to the human eye without magnification and having an average diameter of 40 micrometers or greater. Although some people are able to without magnification visually detect particles having an average diameter smaller than 30 micrometers and other people can detect only particles having an average diameter larger than 40 micrometers, the terms "visible particles," "visible particulates," and "black specks" when used herein without reference to a specified average diameter means those particulates having an average diameter of 40 micrometers or greater. As used herein, the term "substantially free of visible particulate impurities" when applied to the thermoplastic composition means that when the composition is injection molded to form 5 plaques having dimensions of 75 millimeters×50 millimeters and having a thickness of 3 millimeters and the plaques are visually inspected on all sides for black specks with the naked eye the total number of black specks for all five plaques is less than or equal to 100, or, more specifically, less than or equal to 70, or, even more specifically, less than or equal to 50.

In one embodiment the pellets are melted and the composition applied to the conductor by a suitable method such as extrusion coating to form a coated wire. For example, a coating extruder equipped with a screw, crosshead, breaker plate, distributor, nipple, and die can be used. The melted thermoplastic composition forms a covering disposed over a circumference of the conductor. Extrusion coating may employ a single taper die, a double taper die, other appropriate die or combination of dies to position the conductor centrally and avoid die lip build up.

In one embodiment, the composition is applied to the conductor to form a covering disposed over the conductor. Additional layers may be applied to the covering.

In one embodiment the covering material is applied to a conductor having one or more intervening layers between the conductor and the covering to form a covering disposed over the conductor. For instance, an optional adhesion promoting layer may be disposed between the conductor and covering. In another example the conductor may be coated with a metal deactivator prior to applying the covering. In another example the intervening layer comprises a thermoplastic or thermoset composition that, in some cases, is foamed.

The conductor may comprise a single strand or a plurality of strands. In some cases, a plurality of strands may be bundled, twisted, or braided to form a conductor. Additionally, the conductor may have various shapes such as round or oblong. Suitable conductors include, but are not limited to, copper wire, aluminum wire, lead wire, and wires of alloys comprising one or more of the foregoing metals. The conductor may also be coated with, e.g., tin or silver. In some embodiments, the conductor may comprise one or more conductive wires, one or more metal foils, one or more conductive inks, or a combination thereof. There is no particular limitation on the size of the conductor. In some embodiments the conductor size may be greater than or equal to 20 American wire gauge (AWG), or, more specifically greater than or equal to 30 AWG. The conductor size may be less than or equal to 46 AWG.

The cross-sectional area of the conductor and thickness of the covering may vary and is typically determined by the end use of the coated wire and multiconductor cable assembly. In some embodiments the covering has a thickness of 0.15 millimeters to 1.25 millimeters. Within this range the covering thickness may be greater than or equal to 0.20 millimeter, or, more specifically, greater than or equal to 0.3 millimeter. Also within this range the covering thickness may be less than or equal to 1.15 millimeters, or, more specifically, less than or equal to 1.05 millimeters. The coated wire can be used as coated wire without limitation, including, for example, for harness wire for automobiles, wire for household electrical appliances, wire for electric power, wire for instruments, wire for information communication, wire for electric cars, as well as ships, airplanes, and the like.

In some embodiments it may be useful to dry the thermoplastic composition before extrusion. Exemplary drying conditions are 60-90° C. for 2-20 hours. Additionally, in one embodiment, during extrusion coating, the thermoplastic composition is melt filtered, prior to formation of the coating, through one or more filters having opening diameters of 20 micrometers to 150 micrometers. Within this range, the openings diameters may be greater than or equal to 30 micrometers, or more specifically greater than or equal to 40 micrometers. Also within this range the openings diameters may be less than or equal to 130 micrometers, or, more specifically, less than or equal to 110 micrometers. The coating extruder may comprise one or more filters as described above.

In one embodiment, the filter openings have a maximum diameter that is less than or equal to half of the thickness of the covering that will be applied to the conductor. For example, if the coated wire has a covering with a thickness of 200 micrometers, the filter openings have a maximum diameter less than or equal to 100 micrometers.

In another embodiment the melt filtered mixture produced by melt mixing is not pelletized. Rather the molten melt filtered mixture is formed directly into a coating for the conductor using a coating extruder or a film extruder that is in tandem with the melt mixing apparatus, typically a compounding extruder. The coating or film extruder may comprise one or more filters as described above.

A color concentrate or masterbatch may be added to the composition prior to or during the extrusion coating. When a color concentrate is used it is typically present in an amount less than or equal to 3 weight percent, based on the total weight of the composition. In one embodiment dye and/or pigment employed in the color concentrate is free of chlorine, bromine, and fluorine. As appreciated by one of skill in the art, the color of the composition prior to the addition of color concentrate may impact the final color achieved and in some cases it may be advantageous to employ a bleaching agent and/or color stabilization agents. Bleaching agents and color stabilization agents are known in the art and are commercially available.

The extruder temperature for extrusion coating is generally less than or equal to 320° C., or, more specifically, less than or equal to 310° C., or, more specifically, less than or equal to 290° C. Additionally the processing temperature is adjusted to provide a sufficiently fluid molten composition to afford a covering for the conductor, for example, higher than the melting point of the thermoplastic composition, or more specifically at least 10° C. higher than the melting point of the thermoplastic composition.

In one embodiment, the coated wire is cooled using a water bath, water spray, air jets, or a combination comprising one or more of the foregoing cooling methods after extrusion coating. Exemplary water bath temperatures are 20 to 85° C. As mentioned above, when the coated wire is an electrical wire it is checked for spark leaks using an in-line method. An exemplary method of testing for spark leaks comprises using the conductor of the electrical wire as a grounded electrode and passing the electrical wire next to or through a charged electrode such that the electrical wire is in contact with the charged electrode. When the polymeric covering on the electrical wire comprises a defect such as a pin hole or crack an arc between the charged electrode and the conductor of the electrical wire is generated and detected. Exemplary charged electrodes include bead chains and brushes. The electrode may be charged using alternating current or direct current as indicated by the end use of the wire and any relevant industrial specifications for the wire. The voltage may be determined by one of ordinary skill in the art of spark leak testing. In one embodiment the voltage is 2.5 kilovolts. The frequency used depends upon the load capacitance and may also be determined by one of ordinary skill in the art of spark leak testing. Spark testing equipment is commercially available from, for example, The Clinton Instrument Company, Beta LaserMike, and Zumbach.

When a spark leak is detected the electrical wire is cut to remove the portion with the spark leak. Each spark leak therefore generates a new length of wire. In an embodiment, after being checked for spark leaks the electrical wire may be wound onto a spool or like device. Exemplary winding speeds are 50 meters per minute (m/min) to 1500 m/min. The electrical wire may be placed into a container with or without the spool or like device. Several lengths of wire may be combined to make up the total length of wire in a container or on a spool or like device. The total length of the wire put into the container or onto a spool or like device is usually dependent upon the cross sectional area of the conductor and the thickness of the covering.

The length of electrical wire between the spark leaks is important. If a container of electrical wire contains sections (lengths) of wire having a length less than 150 meters, the electrical wire can be inefficient to use because the electrical wire is used in a continuous fashion to build various articles, e.g., wire harnesses, multiconductor cable assemblies, and the like. Work flow must be interrupted to start a new section of electrical wire. Additionally, if there are more than 6 individual sections of electrical wire per container then use of the electrical wire in the manufacture of multiconductor cable assemblies is also inefficient. Thus both the quantity and frequency of sparks leaks is important.

Thus it is clear that a thermoplastic composition must be capable of being applied to the wire in a robust manner with a minimum or absence of spark leaks such that the minimum length of electrical wire having no spark leaks is 150 meters, or more specifically 250 meters, or, even more specifically 500 meters when the wire is tested using the spark leak testing method appropriate to the type of electrical wire. Spark leaks can be caused by imperfections in the covering such as gaps, e.g., pinholes, in the wire covering, particulate matter and the like.

The imperfections can be introduced by the covering process or can originate in the thermoplastic composition. Imperfections may be introduced by the covering process through inadequate cleaning of the coating extruder or if operation of the coating extruder becomes stalled for an extended period of time such that the thermoplastic composition forms gels and black specks. Residual material from a prior covering may form particulates that result in imperfections and spark leaks. Imperfections introduced to the thermoplastic composition may be decreased or eliminated by thorough cleaning of the coating extruder particularly the sections after the filter and melt filtering the thermoplastic composition.

Similarly, cleaning the melt mixing equipment, particularly the sections after the filter can decrease or eliminate particulate materials and gels resulting from residual material from prior use of the compounding extruder.

A cross-section of an exemplary multiconductor cable assembly is seen in FIG. 1. FIG. 1 shows a covering, 10, disposed over a conductor, 11. In one embodiment, the covering, 10, comprises a foamed thermoplastic composition. Conductor, 11, can comprise a unitary conductor or a plurality of strands.

In one embodiment the multiconductor cable assembly comprises one or more coated wires that are coaxial cables.

In one embodiment, the multiconductor cable assembly comprises two or more electrical wires wherein each electrical wire has a conductor with a cross sectional area of 0.15 $mm^2$ to 1.10 $mm^2$ and a covering with a 0.15 millimeter (mm) to 0.25 mm thickness.

In another embodiment, the multiconductor cable assembly comprises two or more electrical wires wherein each electrical wire has a conductor with a cross sectional area of 0.30 to 1.30 square millimeters ($mm^2$) and a covering with a 0.15 to 0.35 mm thickness.

In another embodiment, the multiconductor cable assembly comprises two or more electrical wires wherein each electrical wire has a conductor with a cross sectional area of 1.20 to 2.10 $mm^2$ and a covering with a 0.29 to 0.36 mm thickness.

In another embodiment, the multiconductor cable assembly comprises two or more electrical wires wherein each electrical wire has a conductor with a cross sectional area of 2.90 to 4.50 $mm^2$ and an insulating covering with a 0.3 to 0.8 mm thickness.

Figure 3:
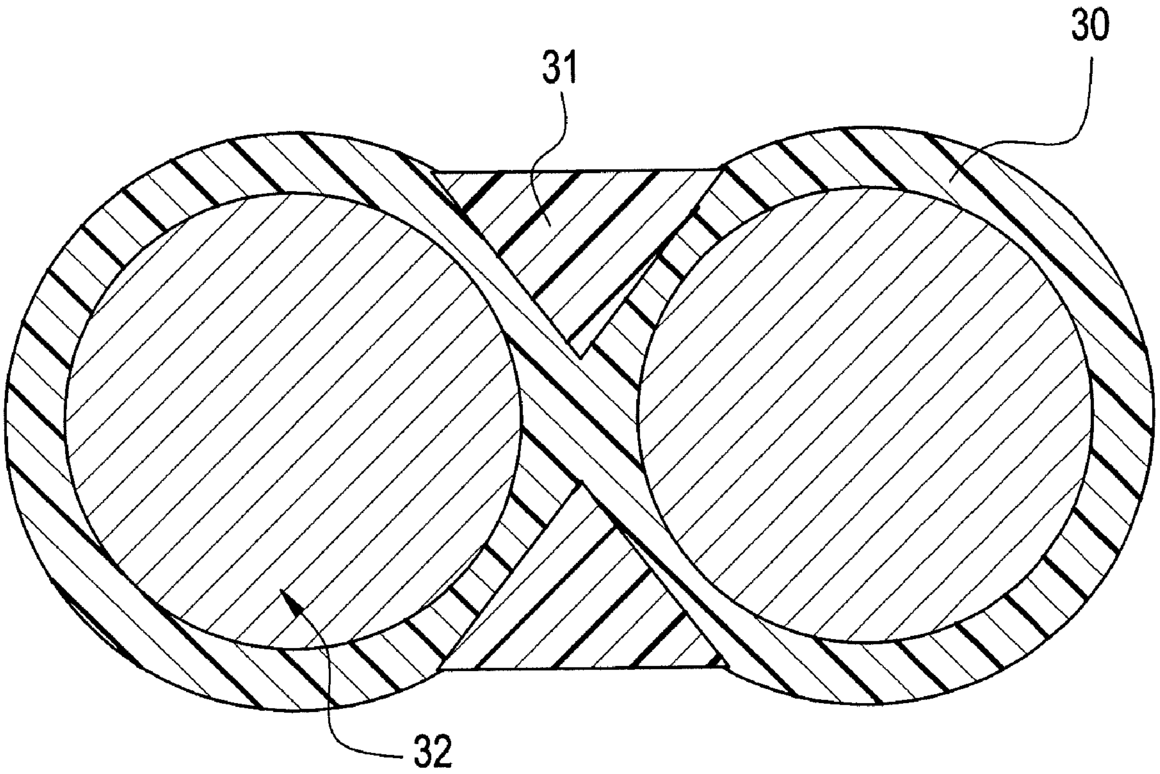
FIG. 3 is a schematic representation of the bonded section, 31, of adjacent coated wires, 30.

In one embodiment, individual coated wires are arranged in a side-by-side contiguous relationship, meaning that the centers of the respective conductors, when viewed in transverse cross section, lie along a single line or plane. Referring now to FIG. 3, each individual coated wire is attached or bonded to the adjacent coated wire through the covering material (30). The sides of the covering material that forms a sheath covering a periphery of the conductor may be flattened where they meet to enhance the contact area between the individual coated wires. Only a minimal amount of bonding need be present to secure the individual coated wire into a multiconductor cable assembly. In some multiconductor cable assemblies, the bonding between individual coated wires may be intermittent so as to minimize any increase in the rigidity of the overall multiconductor cable assembly.

The method of forming the bonding between the individual coated wires can vary widely. Useful methods include heat bonding, ultrasonic welding, solvent welding, laser welding, adhesive bonding, and vibration welding, or a combination of two aforementioned methods. In some embodiments, the individual coated wires are arranged in the previously described side-by-side contiguous relationship in a fixture wherein the bonding can occur. The individual coated wires can be of various colors.

In various embodiments, the multiconductor cable assembly is a ribbon cable comprising three or more coated wires, or nine or more coated wires, or twenty or more coated wires. Also in various embodiments, the multiconductor cable assembly is a ribbon cable comprising three or more conductors, or nine or more conductors, or twenty or more conductors.

In one embodiment, the individual coated wires are orientated into a fixture as part of the wire coating process such that the covering material on adjacent coated wires bond to form a multiconductor cable assembly without collecting the individual coated wires onto spools. In this direct assembly process, one or more bonding techniques such as heat-bonding, ultrasonic welding, solvent welding, laser welding, adhesive bonding, and vibration welding may be applied to insure adequate bonding. Imprinting or ink printing information such as wire coding and brand names onto the covering material may also occur as part of this manufacturing process or may be subsequently applied.

In another embodiment, the individual coated wires from spools are orientated into a fixture such that the covering material on adjacent coated wires bond to form a multiconductor cable assembly. As in the direct assembly process, one or more bonding techniques such as heat-bonding, ultrasonic welding, solvent welding, laser welding, adhesive bonding, and vibration welding may be applied to insure adequate bonding. Imprinting or ink printing information such as wire coding and brand names onto the covering material may also occur as part of this manufacturing process or may be subsequently applied.

Figure 4:
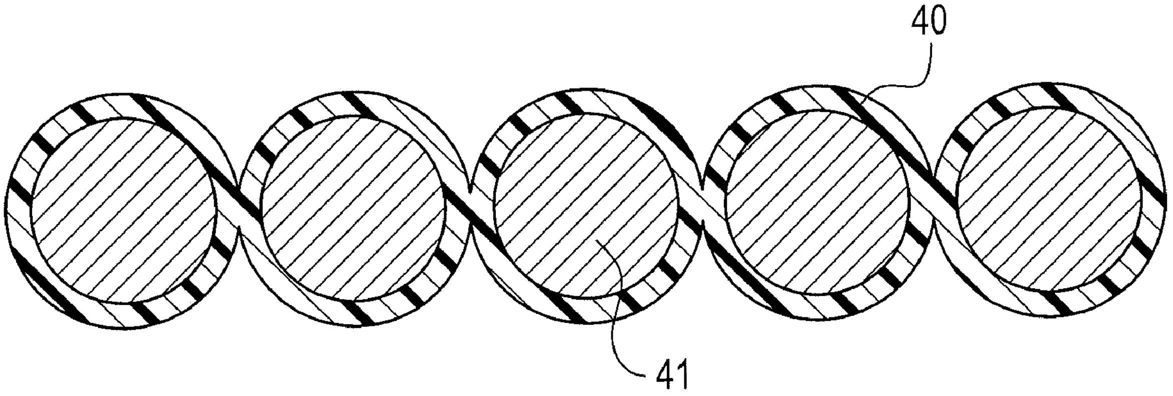
FIG. 4 is a schematic representation of a cross-section of a multiconductor cable assembly wherein the conductors, 41, are substantially in a single plane.

When solvent bonding or adhesive bonding is employed, the bonding agent is preferably applied as a longitudinal bead to the covering material in between adjacent coated wires. In order to insure application of the solvent or adhesive to the contact faces between the individual coated wires, it is generally preferable to apply the solvent or adhesive prior to pressing the adjacent contact faces together in the fixture. Referring to FIG. 3, adhesive may be applied in the channel, 31, between adjacent coated wires. FIG. 4 is a cross-section representation of one embodiment wherein multiple coated wires comprising a thermoplastic composition as a covering, 40, are bonded to form a multiconductor cable assembly with multiple conductors, 41.

Solvent or adhesive can alternatively or additionally be applied as bead in the adjacent area to the interface contact area of the adjacent coated wires. In some multiconductor cable assemblies, the bonding of the individual coated wires is intermittent whereas in others, the bonding of the individual coated wires is continuous.

In some embodiments, the adhesive comprises a solvent. Useful solvents include those that can soften the surface of the covering comprising the thermoplastic composition. Useful adhesives include UV curable, thermally curable, and self-reacting adhesive. Illustrative adhesives include epoxies, acrylates, siloxane, urethane, poly(arylene ether) based solutions, and the like. It is often important to select an adhesive that is flexible and has suitably low viscosity. Illustrative solvents include chlorinated solvents such as chloroethane, chloroform, methylene chloride, chlorobenzene, and the like and aromatic solvents such as benzene and toluene, xylene and xylene derivatives. Especially preferred is toluene and xylene.

Multiconductor cable assemblies can be formed using the thermoplastic compositions described herein as insulation materials for power transmission assemblies and as jacket materials for signal transmission assemblies.

In one embodiment, the coated wires are aligned in a fixture side-by-side in a parallel relation to one another. Colored coated wires can be utilized in a desired sequence in the fixture. When employing a continuous process, 10 to 20 lines of coated wires with a specified wall thickness pass through a series of die sets, i.e. 10-20 dies for 30-40 AWG wires. The space between dies in the first die set is generally relatively large, allowing the individual coated wire to be well separated to avoid sticking of the coverings of adjacent coated wires. The coated wires are subsequently directed or guided to the next die set having gaps that are small enough that coated wires are aligned adjacent to one another. The alignment may involve more than two series of die sets before entering a fixture. The wire fixture has a width that is approximately the product of a single wire diameter multiplying for the number of wire lines. The depth of the fixture varies. In one embodiment, the depth of the fixture is the same as or slightly larger than the overall diameter of a single coated wire. The fixture may also have additional alignment rows that remain unoccupied during the welding operation.

Useful welding solvents may include, e.g., tetrahydrofuran (THF), chloroform, methylene chloride, benzene, toluene, xylene, and their derivatives, as well as various combinations of solvents. In one embodiment the welding solvent comprises toluene, xylene or a combination thereof. The welding solvent is sprayed, brushed, felted, sponged, or soaked onto the coated wires prior to entering the fixture or over the wires in the fixture. The wire lines are exposed to an oven chamber operating at one or more temperatures of 100° C.-175° C., or, more specifically, 120° C.-140° C. Other temperatures can be readily determined based in part on the boiling point of the solvent and the speed of the wires through the oven chamber. The balance of solvent evaporation rate and the rate of solvent penetrating into the depth of jacketing material rate are a matter of empirical estimation. However, the unique composition of polyarylene ether-polyolefin wire coating materials dictates the range of temperatures and heating times to be used so that the combined solvent power is enough to swell or partially dissolve the continuous phase of polyolefin component, enabling bonding to occur among all components involved. The multiconductor cable assembly, e.g., ribbon cable, is thus formed through this combination of relatively mild heat and solvent welding process with negligible welding induced deformation of the covering. The resultant multiconductor cable assemblies are flexible, have no visible heat-induced deformation and no exposure of conductor. They can be bent rigorously without premature separation of wires.

Figure 2:
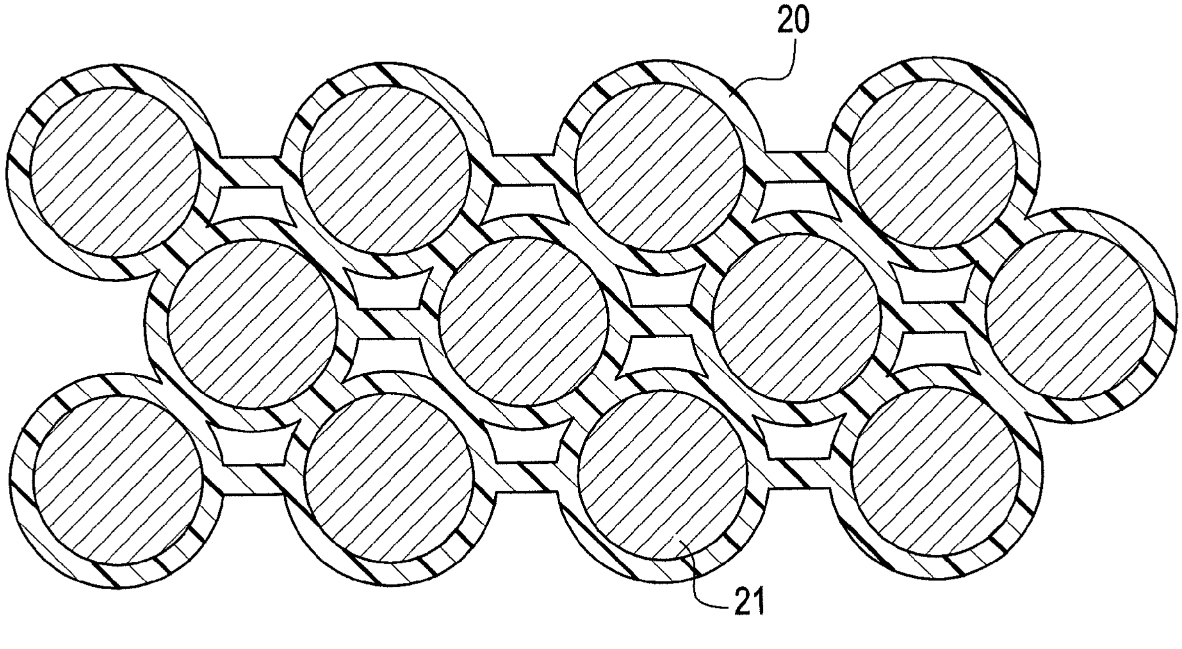
FIG. 2 is a schematic representation of a cross-section of a multiconductor cable assembly wherein the conductors, 21, are in multiple planes.

In one embodiment, multiple rows of oriented coated wires can be assembled to increase the number of conductors within the multiconductor cable assembly for a fixed width of the assembly. FIG. 2 shows a schematic representation of multiple rows of conductors, 21, with the covering, 20, within the multiconductor cable assembly.

Figure 5:
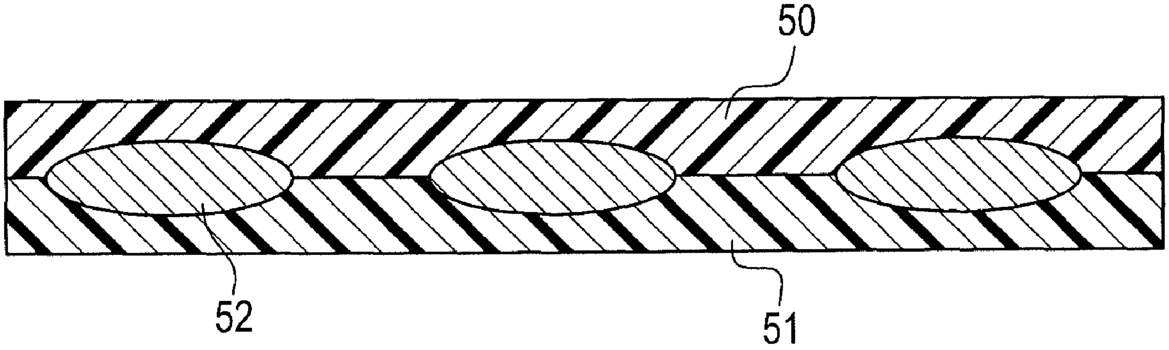
FIG. 5 is a schematic representation of a cross-section of a multiconductor cable assembly highlighting multiple layers, 50 and 51, of coverings enclosing conductors, 52.
Figure 6:
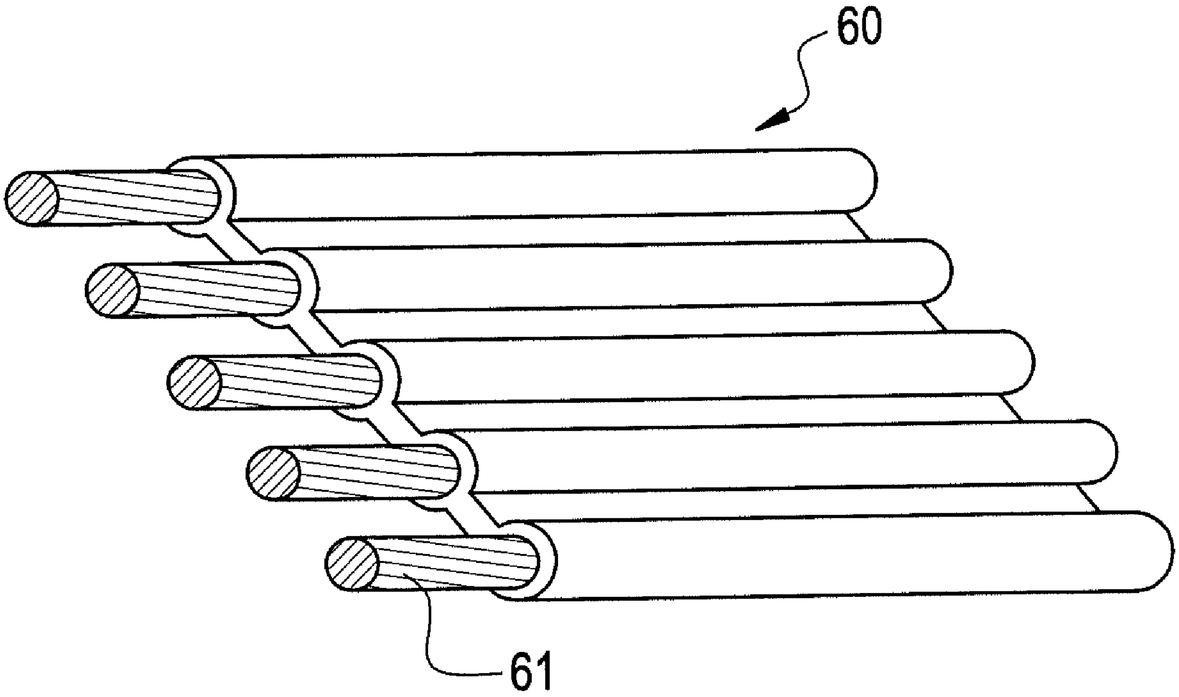
FIG. 6 is a schematic representation of a length-section of a multiconductor cable assembly, 60, wherein the conductors are substantially in a single plane, 61.

In another embodiment, the thermoplastic composition is formed into insulator sheets (also called films and foils) and multiple conductors are arranged in parallel relation to one another over a length of the insulator sheets. The insulating sheets comprise the same thermoplastic compositions as described for the covering material for the coated wire. The insulator sheets are at least partially bonded together with the multiple conductors positioned in between the sheets. Useful bonding techniques include heat bonding, ultrasonic welding, solvent welding, laser welding, adhesive bonding, vibration welding and combinations of two or more of the aforementioned methods. Pressure may also be applied in regions between the conductor elements. Referring to FIG. 5, adjacent layers of thermoplastic composition, 50 and 51, are disposed around conductors, 52.

In one embodiment, multiple stacks of insulator sheets and conductor elements can be assembled to form a sandwich structure for the multiconductor cable assembly.

The structures and methods provided herein are easily adapted to a wide variety of multiconductor cable assemblies for varied uses, e.g., ribbon cable.

The multiconductor cable assembly is further illustrated by the following non-limiting examples.

EXAMPLES

Coated wires comprising a conductor and a covering were formed by extrusion coating. The covering was made of a thermoplastic composition comprising 30-35 weight percent poly(arylene ether), 23-26 weight percent polyolefin, 14-17 weight percent of a block copolymer, and flame retardants. Weight percent is with regard to the total weight of the composition. Five or eight coated wires of uniform length were arranged adjacent to each other in a fixture having a width equal to the sum of the diameters of the coated wires. The wires were then brushed or felted with xylene, toluene or a combination thereof, and heated at a temperature of 130° C. to 175° C. for 1 to 12 minutes to form a multiconductor assembly. The assembly was then cooled at room temperature. The assemblies demonstrated good adhesion strength and little fatigue after rigorous bending (bending through a 180 degree angle) for 70 cycles.

While the invention has been described with reference to a several embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

All cited patents, patent applications, and other references are incorporated herein by reference in their entirety.

The invention claimed is:

1. A method of making a multiconductor cable assembly comprising:

arranging two or more coated wires in a side-by-side contiguous relationship to provide one or more interfacing contact areas between adjacent coated wires; and at least partially bonding the two or more coated wires using at least one of heat-pressing, ultrasonic welding, solvent welding, laser welding, adhesive bonding, and vibration welding wherein one or more of the coated wires comprises:

a conductor, and a covering comprising a thermoplastic composition and the thermoplastic composition comprises:

(i) a poly(arylene ether)
(ii) a polyolefin; and
(iii) a polymeric compatibilizer
wherein the thermoplastic composition is essentially free of an alkenyl aromatic resin;
wherein the covering is disposed over the conductor.

2. The method of claim 1, wherein the polyolefin is a continuous or co-continuous phase and wherein the poly (arylene ether) is a dispersed or co-continuous phase.

3. The method of claim 1, wherein each coated wire is at least partially bonded to an adjacent coated wire using solvent bonding with a solvent selected from the group consisting of toluene, xylene, and combinations thereof.

4. The method of claim 3, wherein the method further comprises evaporating the solvent at a temperature of 100-175° C.

5. The method of claim 1, wherein the multiconductor cable assembly is a ribbon cable comprising three or more coated wires.

6. The method of claim 1, wherein the multiconductor cable assembly is a ribbon cable comprising nine or more coated wires.

7. The method of claim 1, wherein the multiconductor cable assembly is a ribbon cable comprising twenty or more coated wires.

8. The method of claim 1, wherein the polyolefin is selected from the group consisting of polypropylene, high density polyethylene and combinations of polypropylene and high density polyethylene.

9. The method of claim 8, wherein the polypropylene has a melting temperature greater than or equal to 134° C.

10. The method of claim 8, wherein the high density polyethylene has a melting temperature greater than or equal to 124° C.

11. The method of claim 1, wherein the polymeric compatibilizer comprises a block copolymer having a block that is a controlled distribution copolymer.

12. The method of claim 1, wherein the polymeric compatibilizer comprises a first block copolymer having an aryl alkylene content greater than or equal to 50 weight percent based on the total weight of the first block copolymer and a second block copolymer having an aryl alkylene content less than or equal to 50 weight percent based on the total weight of the second block copolymer.

13. The method of claim 1, wherein the polymeric compatibilizer comprises a diblock copolymer and a triblock copolymer.

14. The method of claim 1, wherein the polymeric compatibilizer comprises a polypropylene-polystyrene graft copolymer.

15. The method of claim 1, wherein the thermoplastic composition further comprises a flame retardant.

16. The method of claim 1, wherein the thermoplastic composition comprises polyolefin in an amount by weight that is less than the amount of poly(arylene ether) by weight, based on a combined weight of polyolefin and poly (arylene ether).

17. The method of claim 1, wherein the covering is disposed over the conductor by extrusion coating.

18. The method of claim 1, wherein the thermoplastic composition can be pelletized.

19. The method of claim 1, wherein an optional intervening layer may be disposed between the conductor and the covering.

20. The method of claim 19, wherein the optional intervening layer is an adhesion promoting layer, a metal deactivator, a thermoplastic composition, a thermoset composition, or combination of the foregoing intervening layer materials.

21. The method of claim 1 wherein the thermoplastic composition comprises:
(i) poly(arylene ether) in an amount of 30 to 65 weight percent (wt%), with respect to the total weight of the composition,
(ii) polyolefin in an amount of 15 to 35 weight percent (wt%), with respect to the total weight of the composition; and
(iii) polymeric compatibilizer in an amount of 2 to 30 weight percent (wt%), with respect to the total weight of the composition.

* * * * *